US011997519B2

(12) United States Patent
Jia et al.

(10) Patent No.: US 11,997,519 B2
(45) Date of Patent: May 28, 2024

(54) METHOD AND APPARATUS FOR RECEIVING AND TRANSMITTING CONFIGURATION INFORMATION AND COMMUNICATION SYSTEM

(71) Applicant: FUJITSU LIMITED, Kawasaki (JP)

(72) Inventors: Meiyi Jia, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 16/922,767

(22) Filed: Jul. 7, 2020

(65) Prior Publication Data
US 2020/0336931 A1  Oct. 22, 2020

Related U.S. Application Data

(63) Continuation of application No. PCT/CN2018/073385, filed on Jan. 19, 2018.

(51) Int. Cl.
*H04W 24/10* (2009.01)
*H04W 8/24* (2009.01)
*H04W 24/08* (2009.01)
*H04W 56/00* (2009.01)
*H04W 72/23* (2023.01)

(52) U.S. Cl.
CPC ........ *H04W 24/10* (2013.01); *H04W 8/245* (2013.01); *H04W 24/08* (2013.01); *H04W 56/001* (2013.01); *H04W 72/23* (2023.01)

(58) Field of Classification Search
CPC ..... H04W 24/10; H04W 8/245; H04W 24/08; H04W 56/001; H04W 72/042
See application file for complete search history.

(56) References Cited

U.S. PATENT DOCUMENTS 10,285,028 B2 * 5/2019 Chincholi ............. H04L 1/0067
10,523,347 B2 * 12/2019 Hwang ................. H04L 5/0048
(Continued)

FOREIGN PATENT DOCUMENTS

CN   102036382 A   4/2011
CN   102907158 A   1/2013
(Continued)

OTHER PUBLICATIONS

KR-20110134475-A—English Translation (Year: 2022).*
(Continued)

*Primary Examiner* — Chi H Pham
*Assistant Examiner* — Weibin Huang
(74) *Attorney, Agent, or Firm* — Myers Wolin, LLC

(57) ABSTRACT

A method and apparatus for receiving and transmitting configuration information and a communication system. The method includes: receiving, by a terminal device, first configuration information used for radio link monitoring transmitted by a network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

17 Claims, 10 Drawing Sheets

(56) References Cited

U.S. PATENT DOCUMENTS

| | | | | |
|---|---|---|---|---|
| 11,101,863 | B2* | 8/2021 | Kang | H04L 5/0094 |
| 2011/0275394 | A1* | 11/2011 | Song | H04W 72/54 |
| | | | | 455/509 |
| 2012/0113843 | A1 | 5/2012 | Watfa et al. | |
| 2013/0003534 | A1 | 1/2013 | Henry et al. | |
| 2013/0084910 | A1 | 4/2013 | Suzuki et al. | |
| 2014/0086152 | A1 | 3/2014 | Bontu et al. | |
| 2014/0286176 | A1 | 9/2014 | Ro et al. | |
| 2020/0274657 | A1* | 8/2020 | Deenoo | H04W 76/27 |
| 2020/0314946 | A1* | 10/2020 | Tsuboi | H04W 24/10 |
| 2020/0336931 | A1* | 10/2020 | Jia | H04W 8/245 |
| 2020/0337103 | A1* | 10/2020 | Harada | H04W 76/27 |
| 2020/0344019 | A1* | 10/2020 | Da Silva | H04B 7/0626 |
| 2020/0351126 | A1* | 11/2020 | Siomina | H04W 76/25 |
| 2020/0359241 | A1* | 11/2020 | Siomina | H04B 7/0695 |
| 2021/0099263 | A1* | 4/2021 | Cheng | H04L 5/0048 |

FOREIGN PATENT DOCUMENTS

| | | | | |
|---|---|---|---|---|
| KR | 20110134475 A | * | 12/2011 | H04L 5/001 |
| KR | 10-2013-0036510 A | | 4/2013 | |
| WO | 2014/068535 A2 | | 5/2014 | |
| WO | 2014/161195 A1 | | 10/2014 | |

OTHER PUBLICATIONS

International Search Report with Written Opinion of the International Searching Authority issued by the State Intellectual Property Office of the P.R. China for corresponding International Patent Application No. PCT/CN2018/073385, dated Sep. 28, 2018, with English translation.

Extended European search report with the supplementary European search report and the European search opinion, Issued by the European Patent Office for corresponding European Patent Application No. 18901149.7-1205, dated Aug. 9, 2021.

Qualcomm Incorporated, "Radio link monitoring consideration", Agenda Item: 7.1.5.2, 3GPP TSG-RAN WG1 Meeting RAN1 #90bis, R1-1718534, Prague, Austria, Oct. 9-13, 2017.

Samsung Electronics, "RLM signalling for NR", Agenda Item: 10.4.1.3.4, 3GPP TSG-RAN2 AH-1801, R2-1801489, Vancouver, Canada, Jan. 22-26, 2018.

Motorola Mobility et al, "Beam recovery and radio link monitoring", Agenda Item: 6.1.5.2, 3GPP TSG-RAN WG1 NR Ad-Hoc #3, R1-1716640, Nagoya, Japan, Sep. 18-21, 2017.

Notice of Reasons for Refusal issued by the Japan Patent Office for corresponding Japanese Patent Application No. 2020-538657, dated Aug. 17, 2021, with an English translation.

Intel Corporation, "Summary of Discussion for NR Radio Link Monitoring", Agenda Item: 7.1.5.2, 3GPP TSG-RAN WG1 Meeting #90bis, R1-1719169, Prague, Czech Republic, Oct. 9-13, 2017.

Spreadtrum Communications, "Discussions on the IS and OOS counting procedure", Agenda Item: 10.2.12, 3GPP TSG-RAN WG2 Meeting #100, R2-1712276, Reno, USA, Nov. 27-Dec. 1, 2017.

Notice of Reasons for Refusal issued by the Japan Patent Office for corresponding Japanese Patent Application No. 2020-538657, dated Feb. 7, 2023, with an English translation.

First Notification of Office Action and Search Report issued by the China National Intellectual Property Administration for corresponding Chinese Patent Application No. 201880082344.8, dated Feb. 28, 2023, with an English translation.

Communication pursuant to Article 94(3) EPC issued by the European Patent Office for corresponding European Patent Application No. 18 901 149.7-1206, dated Sep. 6, 2023.

Second Notification of Office Action issued by the China National Intellectual Property Administration for corresponding Chinese Patent Application No. 201880082344.8, dated Sep. 20, 2023, with an English translation.

* cited by examiner

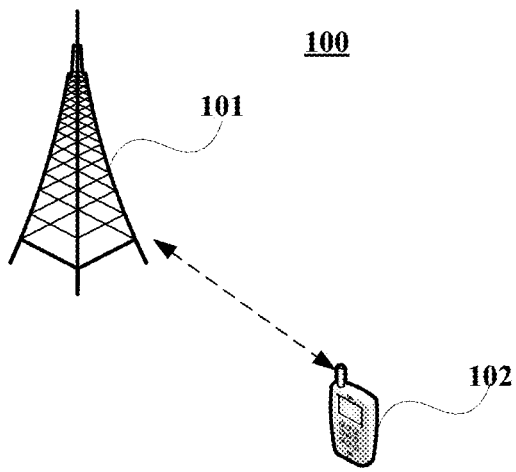
Fig. 1
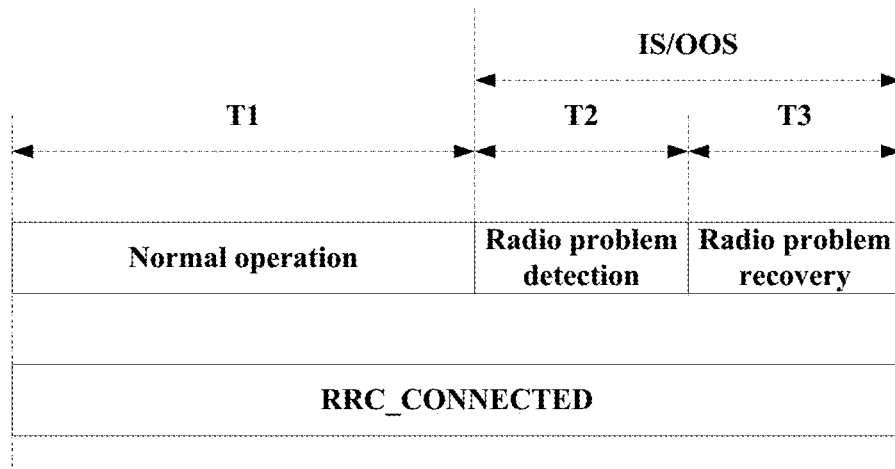
Fig. 2
Fig. 3

METHOD AND APPARATUS FOR RECEIVING AND TRANSMITTING CONFIGURATION INFORMATION AND COMMUNICATION SYSTEM

CROSS REFERENCE TO RELATED APPLICATIONS

This application is a continuation application of International Application No. PCT/CN2018/073385, filed on Jan. 19, 2018, the contents of which are incorporated herein by reference.

TECHNICAL FIELD

This disclosure relates to the field of communication technologies, and in particular to a method and apparatus for receiving and transmitting configuration information and a communication system.

BACKGROUND

Radio link monitoring (RLM) is used to monitor downlink radio link quality of a specific cell. The specific cell may include, for example, a primary cell (PCell) or a secondary cell (SCell). In-synchronization indication and out-of-synchronization indication are results of radio link monitoring at a physical layer.

For example, when radio link quality of all configured RLM resources of a specific cell is worse than a threshold $Q_{out}$, a physical layer of a terminal device reports an out-of-synchronization indication to a higher layer (such as a radio resource control (RRC) layer) in a frame where radio link quality evaluation is performed. And when radio link quality of any configured RLM resource of a specific cell is better than a threshold $Q_{in}$, a physical layer of a terminal device reports an in-synchronization indication to a higher layer in a frame where radio link quality evaluation is performed.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that due to the introduction of beams and in order to support different services having different radio link quality requirements, flexible configuration of radio link monitoring needs to be supported. However, current configuration schemes for radio link monitoring are not flexible enough to meet the demands of different growing services.

Embodiments of this disclosure provide a method and apparatus for receiving and transmitting configuration information and a communication system, in which it is expected that not only introduction of beams and different services having different radio link quality requirements may be supported, but also flexibility and accuracy of configuration of radio link monitoring may be supported.

According to a first aspect of the embodiments of this disclosure, there is provided a method for receiving configuration information, including:
receiving first configuration information used for radio link monitoring transmitted by a network device, the first configuration information at least including threshold configuration of the radio link monitoring and/or resource configuration used for the radio link monitoring.

According to a second aspect of the embodiments of this disclosure, there is provided an apparatus for receiving configuration information, including:
a receiving unit configured to receive first configuration information used for radio link monitoring transmitted by a network device, the first configuration information at least including threshold configuration of the radio link monitoring and/or resource configuration used for the radio link monitoring.

According to a third aspect of the embodiments of this disclosure, there is provided a method for transmitting configuration information, including:
transmitting first configuration information used for radio link monitoring to a terminal device, the first configuration information at least including threshold configuration of the radio link monitoring and/or resource configuration used for the radio link monitoring.

According to a fourth aspect of the embodiments of this disclosure, there is provided an apparatus for transmitting configuration information, including:
a transmitting unit configured to transmit first configuration information used for radio link monitoring to a terminal device, the first configuration information at least including threshold configuration of the radio link monitoring and/or resource configuration used for the radio link monitoring.

According to a fifth aspect of the embodiments of this disclosure, there is provided a communication system, including:
a terminal device, including the apparatus for receiving configuration information as described in the second aspect; and
a network device, including the apparatus for transmitting configuration information as described in the fourth aspect.

An advantage of the embodiments of this disclosure exists in that the terminal device receives the first configuration information used for radio link monitoring transmitted by the network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 1 is a schematic diagram of a communication system of an embodiment of this disclosure;

FIG. 2 is an exemplary diagram of radio problem detection of an embodiment of this disclosure;

FIG. 3 is a schematic diagram of the method for receiving configuration information of Embodiment 1 of this disclosure;

DETAILED DESCRIPTION

Figure 4:
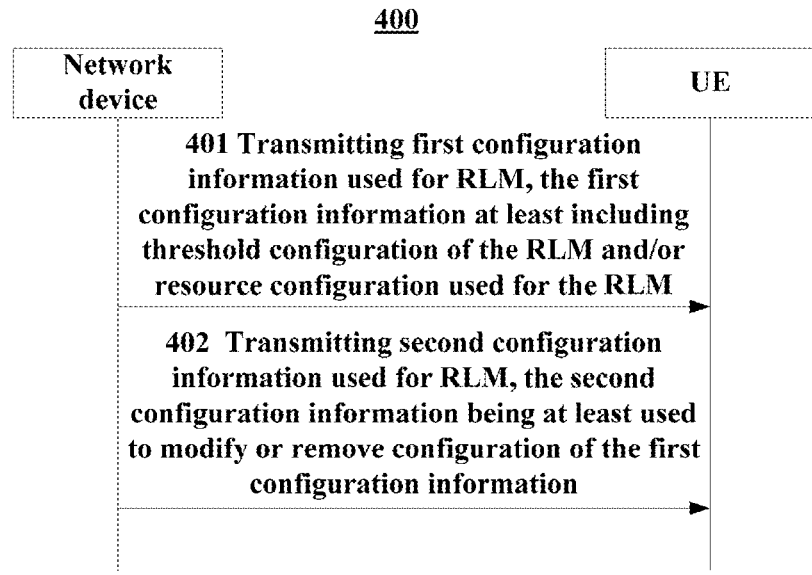
FIG. 4 is a schematic diagram of the method for transmitting and receiving configuration information of Embodiment 1 of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

And furthermore, the term "network side" or "network device side" refers to a side of the network, which may be a base station, and may include one or more of the above network devices. The term "user equipment side" or "terminal device side" refers to a side of the user equipment or terminal device, which may be user equipment, and may include one or more of the above terminal devices.

Scenarios in the embodiments of this disclosure shall be described below by way of examples; however, this disclosure is not limited thereto.

FIG. 1 is a schematic diagram of a communication system of an embodiment of this disclosure, in which a case where a terminal device and a network device are taken as examples is schematically shown. As shown in FIG. 1, the communication system 100 may include a network device 101 and a terminal device 102. For the sake of simplicity, FIG. 1 shall be described by taking only one terminal device and one network device as examples; however, the embodiment of this disclosure is not limited thereto.

In the embodiment of this disclosure, existing traffics or traffics that may be implemented in the future may be performed between the network device 101 and the terminal device 102. For example, such traffics may include but not limited to an enhanced mobile broadband (eMBB), massive machine type communication (MTC), and ultra-reliable and low-latency communication (URLLC).

In a new radio (NR) system, for example, the following triggering conditions for radio link failures may be supported: timer expiration, the timer is started when it is determined that there exists a radio problem; a random access procedure failure; or a radio link control (RLC) failure.

FIG. 2 is an exemplary diagram of radio problem detection, determination and recovery of the embodiment of this disclosure described in a termed manner. As shown in FIG. 2, the terminal device may be in different terms in performing radio link monitoring, such as a first term (T1) of a normal operation.

When a radio resource control (RRC) layer of the terminal device receives a certain number (such as consecutive N310) of pieces of out-of-synchronization (OOS) indication of a specific cell indicated by a lower layer (such as a physical layer), a timer (such as T310) is started. Such a term may be referred to as a second term (T2) for performing radio problem detection.

During operation of the timer, if an RRC layer receives a certain number (such as consecutive N311) of pieces of in-synchronization (IS) indication of the specific cell, the timer is stopped. And when this timer expires, the RRC layer deems that a radio link failure occurs. This term may be referred to as a third term (T3) for performing radio problem recovery.

In the embodiment of this disclosure, the radio problem recovery procedure in FIG. 2 is described as an example; however, the embodiment of this disclosure is not limited thereto. For example, the first term (T1) for performing a normal operation may include: a period during which the RRC layer of the terminal device does not receive any out-of-synchronization indication submitted by the lower layer (such as a physical layer) in a period of time, and the timer used for the radio problem recovery is not started; or, a period during which the RRC layer of the terminal device does not receive consecutive out-of-synchronization indication submitted by the lower layer, and the timer for the radio problem recovery is not started. The period of time may include a predefined period of time, or a period of time configured by the network device, or a period of time from when the terminal device enters into a connected state to when the terminal device receives reconfiguration information.

On the other hand, in the NR system, the network device may provide the following parameters related to radio link monitoring/radio problem detection for the terminal device:

RLM IS/OOS threshold configuration: NR RLM supports 2 sets of IS/OOS parameters, and the network device may indicate the terminal device to use one of the two sets by using index 0 or 1; for example, 0 is a default value, corresponding to an IS threshold of 2% block error rate (BLER) and an OOS threshold of 10% BLER, the threshold configuration may be UE-specific parameters; and resource configuration for RLM: for example, monitoring frequencies below 3 GHz and supporting configuration of two resources, monitoring frequencies of 3-6 GHz and supporting configuration of four resources, and monitoring frequencies of higher than 6 GHz and supporting configuration of eight resources; these resources may indicate a synchronization signal block (SSB) used for the RLM via an SSB index, or may indicate a channel state information reference signal (CSI-RS) resource used for the RLM via an ID of a CSI-RS; and the resource configuration may be UE-specific parameters.

For example, only the SSB may be configured, or only the CSI-RS resource may be configured, or both the SSB and the CSI-RS resource may be configured. However, this disclosure is not limited thereto; for example, resources of other reference signals for measuring a channel state may also be used.

Due to the introduction of beams and in order to support different services having different radio link quality requirements, flexible configuration of radio link monitoring needs to be supported. In the NR system, when the above resources or parameters are configured/reconfigured by a higher layer (such as an RRC layer), influence on the RLM, physical layer problem detection, and radio link failure triggering needs to be taken into account. For example, in reconfiguring the radio link monitoring, if the resources for the RLM are changed, it means that an object of the radio link monitoring changes. For another example, in reconfiguring the radio link monitoring, if the IS/OOS threshold is changed, it means that a result of the radio link monitoring may possibly change.

Hence, it is expected that not only introduction of beams and different services having different radio link quality requirements may be supported, but also flexibility and accuracy of configuration of radio link monitoring may be supported. The embodiments of this disclosure shall be described below by taking an NR system as an example. However, this disclosure is not limited thereto, and may be applicable to any system or scenario where such problems exist.

Embodiment 1

These embodiments of this disclosure provide a method for receiving configuration information. FIG. 3 is a schematic diagram of the method for receiving configuration information of the embodiment of this disclosure. As shown in FIG. 3, the method 300 for receiving configuration information includes:

step 301: a terminal device receives first configuration information used for radio link monitoring transmitted by a network device, the first configuration information at least including threshold configuration of the radio link monitoring and/or resource configuration used for the radio link monitoring.

In an embodiment, the threshold configuration of the radio link monitoring includes: a criterion and/or a parameter used for selecting a radio link monitoring threshold from a plurality of thresholds, and/or an index indicating an in-synchronization threshold and/or an out-of-synchronization threshold. And the resource configuration used for the radio link monitoring includes: an index indicating an SSB, and/or an ID used for obtaining a CSI-RS resource. However, this disclosure is not limited thereto; for example, they may also be other parameters.

For example, a pair of thresholds may be selected from a plurality of thresholds according to the criterion and/or the parameter and taken as the radio link monitoring threshold. The criterion and/or the parameter may include at least one of the following: the criterion itself, a parameter used for determining the criterion, a parameter calculated according to the criterion, and an index of the criterion, etc.; however, this disclosure is not limited thereto.

In an embodiment, the first configuration information may be carried in an information element (IE) of a reconfiguration message (such as an RRC reconfiguration message); and furthermore, the first configuration information may also be carried in one or more messages, or may be carried in one or more IEs.

For example, both IE 1 in message 1 and IE 2 in message 2 may carry the first configuration information, and IE 2 in message 2 may modify or replace IE 1 in message 1. It should be noted that message 1 and message 2 may be different messages with different names and used for different scenarios, or may be identical messages; and these particular implementations are not limited in this disclosure.

Therefore, by transmitting the threshold configuration and/or the resource configuration used for the radio link monitoring by the network device to the terminal device, not only introduction of beams may be supported and different services having different link quality demands may be supported, but also flexibility and accuracy of configuration of radio link monitoring may be improved.

FIG. 4 is a schematic diagram of the method for transmitting and receiving configuration information of the embodiment of this disclosure. As shown in FIG. 4, the method 400 for transmitting and receiving configuration information includes:

step 401: a network device transmits first configuration information used for radio link monitoring to a terminal device, the first configuration information at least including threshold configuration of the radio link monitoring and/or resource configuration used for the radio link monitoring; and step 402: the network device transmits second configuration information used for radio link monitoring to the terminal device, the second configuration information being at least used to modify or remove configuration of the first configuration information.

In an embodiment, the first configuration information and the second configuration information may be respectively carried in information elements (IEs) of a reconfiguration message (such as an RRC reconfiguration message); and furthermore, the first configuration information or the second configuration information may also be carried in one or more messages, or may be carried in one or more IEs.

For example, IE 1 in message 1 may carry the first configuration information, and IE 2 in message 2 may carry the second configuration information, and IE 2 in message 2 may modify or replace IE 1 in message 1. It should be noted that message 1 and message 2 may be different messages with different names and used for different scenarios, or may be identical messages; and these particular implementations are not limited in this disclosure.

In one embodiment, the terminal device may determine that the second configuration information is different from the first configuration information. For example, at least one of the following cases may be included: a resource in the second configuration information is different from a resource in the current configuration information, a threshold in the second configuration information is different from a threshold in the current configuration information, all resources in the second configuration information are different from resources in the current configuration information, some resources in the second configuration information are different from resources in the current configuration information, a threshold in the second configuration information is larger than a threshold in the current configuration information, and a threshold in the second configuration information is smaller than a threshold in the current configuration information.

For example, the second configuration information may be used to modify the first configuration information, or the second configuration information may be used to remove configuration related to the first configuration information. For example, an index of IS/OOS threshold configuration may be reconfigured as 1 from 0 via the second configuration information; or an index of IS/OOS threshold configuration that is not previously configured (such as a default threshold pair) may be configured as 1 via the second configuration information. For another example, an index of IS/OOS threshold configuration may be reconfigured as 0 from 1 via the second configuration information; or when a need code of the threshold configuration is need R or need N, the second configuration information does not include IS/OOS threshold configuration.

In one embodiment, the terminal device may apply the second configuration information to the radio link monitoring after receiving the second configuration information. Furthermore, the terminal device may perform at least one of the following operations: recounting consecutive out-of-synchronization indication, resetting a consecutive out-of-synchronization indication counter, recounting consecutive in-synchronization indication, resetting a consecutive in-synchronization indication counter, and restarting a first timer.

The first timer is at least related to the number of pieces of the consecutive out-of-synchronization indication or is at least related to the number of pieces of the consecutive in-synchronization indication. For example, the first timer is T310, and may be started or stopped according to the number of pieces of consecutive out-of-synchronization indication or the number of pieces of consecutive in-synchronization indication, not excluding that the timer is started or stopped by other mechanisms. However, this disclosure is not limited thereto; for example, other timers or other timing may be used.

The reconfiguration of this embodiment shall be further described below by taking the terms shown in FIG. 2 as an example.

Figure 5:
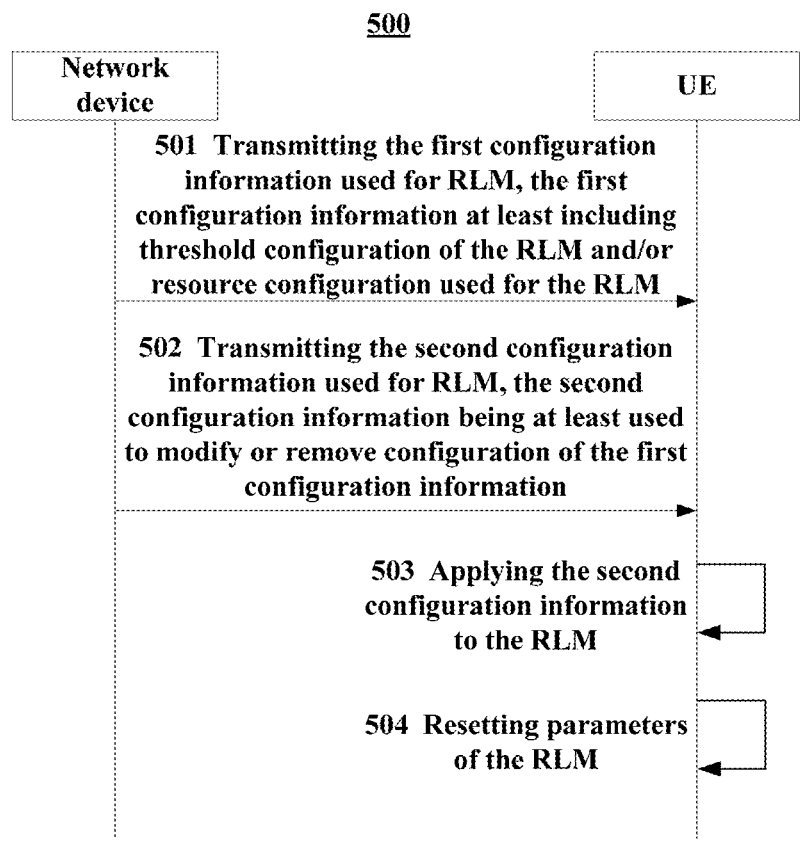
FIG. 5 is another schematic diagram of the method for transmitting and receiving configuration information of Embodiment 1 of this disclosure.

FIG. 5 is another schematic diagram of the method for transmitting and receiving configuration information of the embodiment of this disclosure. As shown in FIG. 5, the method 500 for transmitting and receiving configuration information includes:

step 501: the network device transmits the first configuration information used for radio link monitoring to the terminal device, the first configuration information at least including threshold configuration of the radio link monitoring and/or resource configuration used for the radio link monitoring; and step 502: the network device transmits the second configuration information used for radio link monitoring to the terminal device, the second configuration information being at least used to modify or remove configuration of the first configuration information.

As shown in FIG. 5, the method may further include:

step 503: the terminal device applies the second configuration information to the radio link monitoring; and step 504: the terminal device resets parameters of the radio link monitoring.

For example, after the terminal device receives the second configuration information, the RLM operation may be fallen back, which may be fallen back to the first term for performing normal operation, or may be fallen back to an initial state of a term in which the terminal device is when it receives the second configuration information, or other intermediate states.

For another example, after receiving the second configuration information, the terminal device may recalculate the number of pieces of consecutive out-of-synchronization indication if it is determined to be in the second term of the radio problem detection.

For a further example, after receiving the second configuration information, the terminal device may perform one of the following operations if it is determined to be in the third term of the radio problem recovery, such as during operation of the timer (such as T310) used for radio problem recovery: recalculating the number of pieces of consecutive in-synchronization indication; restarting the timer (such as T310) used for recovery and recalculating the number of pieces of consecutive in-synchronization indication; restarting the timer (such as T310) used for recovery and continuing to calculate the number of pieces of consecutive in-synchronization indication; stopping timer (such as T310) used for recovery and recalculating the number of pieces of consecutive out-of-synchronization indication.

Hence, not only introduction of beams and different services having different radio link quality requirements may be supported, but also flexibility and accuracy of configuration of radio link monitoring may be supported. Furthermore, the reconfiguration parameters may be applied to the radio link monitoring in time, and a problem of inaccurate evaluation of radio link quality by an RRC layer due to the application of the new configuration may be solved by resetting the RLM-related variables.

In another embodiment, whether the configuration modified or removed based on the second configuration information is applied to the radio link monitoring may be determined according to one or more of the out-of-synchronization indication, the in-synchronization indication, and the timer.

Figure 6:
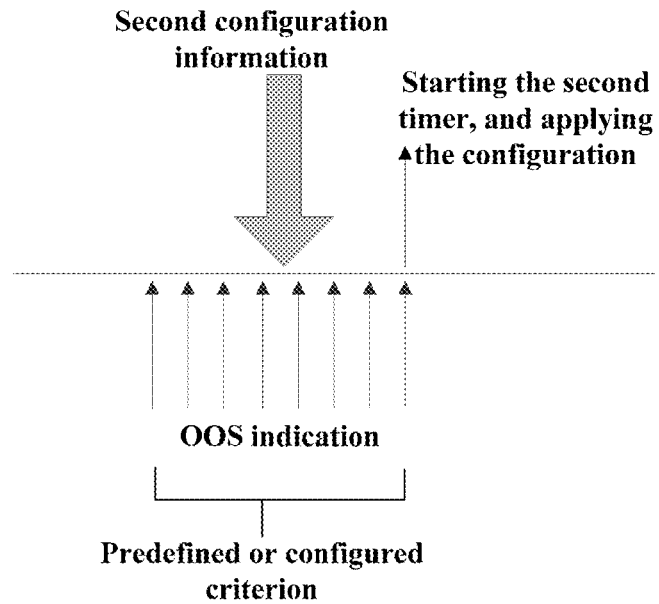
FIG. 6 is an exemplary diagram of configuration information being applied of Embodiment 1 of this disclosure.

FIG. 6 is an exemplary diagram of the configuration information being applied of the embodiment of this disclosure. For example, as shown in FIG. 6, before receiving the second configuration information, the terminal device may determine that there exists at least one piece of out-of-synchronization indication and the second timer is not started. For example, the RRC layer may determine, according to indication of the physical layer, whether there exists at least one piece of out-of-synchronization indication, or determine the number of pieces of out-of-synchronization indication, or determine the number of pieces of consecutive out-of-synchronization indication. And reference may be made to the relevant art for particulars.

In this case, after receiving the second configuration information, the terminal device may determine and start the second timer (such as T310) according to a predefined criterion, and apply the configuration modified or removed based on the second configuration information to the radio link monitoring. The second timer may be started and the second configuration information may be applied at the same time, or the second timer may be started first and then the second configuration information is applied; and this disclosure is not limited thereto.

Figure 7:
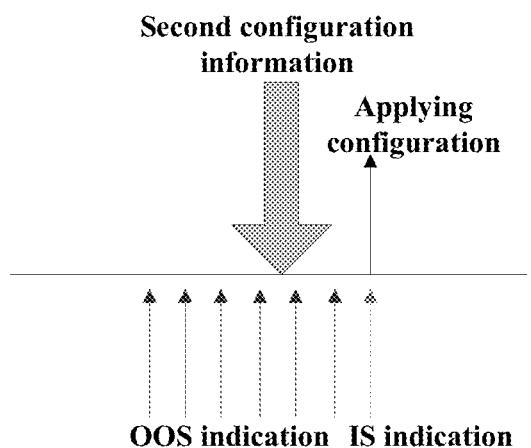
FIG. 7 is another exemplary diagram of configuration information being applied of Embodiment 1 of this disclosure.

FIG. 7 is another exemplary diagram of the configuration information being applied of the embodiment of this disclosure. For example, as shown in FIG. 7, after receiving the second configuration information, the terminal device may determine that there exists at least one piece of in-synchronization indication. For example, the RRC layer may determine, according to indication of the physical layer, whether there exists at least one piece of in-synchronization indication, or determine the number of pieces of in-synchronization indication, or determine the number of pieces of consecutive in-synchronization indication. And reference may be made to the relevant art for particulars. In this case, the terminal device may apply the configuration modified or removed based on the second configuration information to the radio link monitoring.

In this embodiment, the terminal device may start the second timer according to a predefined first criterion, or start the second timer according to a second criterion determined based on at least the second configuration information. For example, the first criterion is that the number of pieces of the consecutive out-of-synchronization indication is equal to a predefined first numeral value, and/or the second criterion is that the number of pieces of the consecutive out-of-synchronization indication is equal to a second numeral value, the second numeral value being obtained at least based on the second configuration information.

For example, the predefined first numeral value may be a constant (such as N310), or the predefined first numeral value may be a numeral value determined from at least two candidate numeral values based on a predefined rule (for example, it is selected from one of N310 and a numeral value smaller than N310 or a scaled down value, or from one of N310 and a numeral value larger than N310 or a scaled up value). And the second numeral value may be directly included in the second configuration information, or may be obtained according to the method included in the second configuration information. For example, the second configuration information includes a scaling factor 2 or 0.5, and the second numeral value may be determined as being 2 times or 0.5 time the value before the second configuration information is received.

Figure 8:
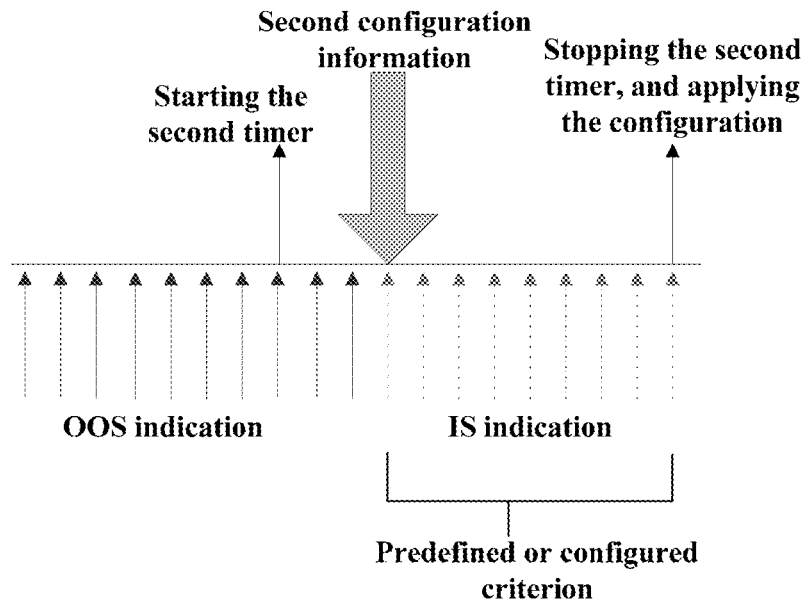
FIG. 8 is a further exemplary diagram of configuration information being applied of Embodiment 1 of this disclosure.

FIG. 8 is a further exemplary diagram of the configuration information being applied of the embodiment of this disclosure. For another example, as shown in FIG. 8, before receiving the second configuration information, the terminal device has started the second timer, and when the second timer expires or stops, the terminal device may apply the configuration modified or removed based on the second configuration information to the radio link monitoring.

Figure 9:
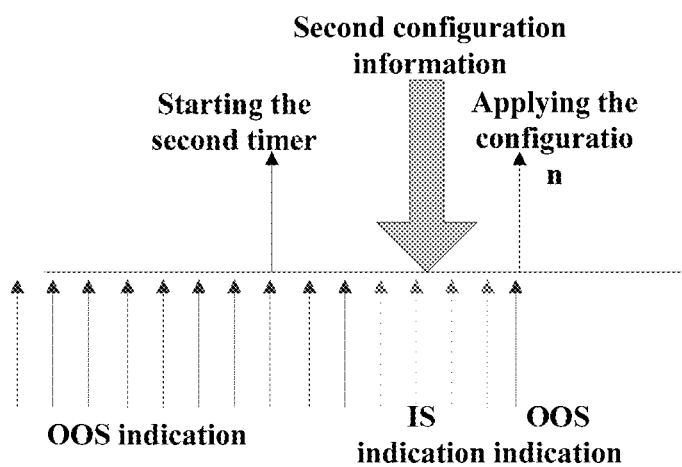
FIG. 9 is yet another exemplary diagram of configuration information being applied of Embodiment 1 of this disclosure.

FIG. 9 is yet another exemplary diagram of the configuration information being applied of the embodiment of this disclosure. For a further example, as shown in FIG. 9, before receiving the second configuration information, the terminal device has started the second timer, and after receiving the second configuration information, the terminal device may determine that there exists at least one piece of out-of-synchronization indication. For example, the RRC layer may determine, according to indication of the physical layer, whether there exists at least one piece of out-of-synchronization indication, or determine the number of pieces of out-of-synchronization indication, or determine the number of pieces of consecutive out-of-synchronization indication. And reference may be made to the relevant art for particulars. In this case, the terminal device may apply the configuration modified or removed based on the second configuration information to the radio link monitoring.

The terminal device may further stop the second timer according to a predefined third criterion, or stop the second timer according to a fourth criterion determined based on at least the second configuration information. For example, the third criterion is that the number of pieces of the consecutive in-synchronization indication is equal to a predefined third numeral value, and/or the fourth criterion is that the number of pieces of the consecutive in-synchronization indication is equal to a fourth numeral value, the fourth numeral value being obtained at least based on the second configuration information.

For example, the predefined third numeral value may be a constant (such as N311), or the predefined third numeral value may be a numeral value determined from at least two candidate numeral values based on a predefined rule (for example, it is selected from one of N311 and a numeral value smaller than N311 or a scaled down value, or from one of N311 and a numeral value larger than N311 or a scaled up value). And the fourth numeral value may be directly included in the second configuration information, or may be obtained according to the method included in the second configuration information. For example, the second configuration information includes a scaling factor 2 or 0.5, and the fourth numeral value may be determined as being 2 times or 0.5 time the value before the second configuration information is received.

The reconfiguration of this embodiment shall be further described below by taking the terms shown in FIG. 2 as an example.

Figure 10:
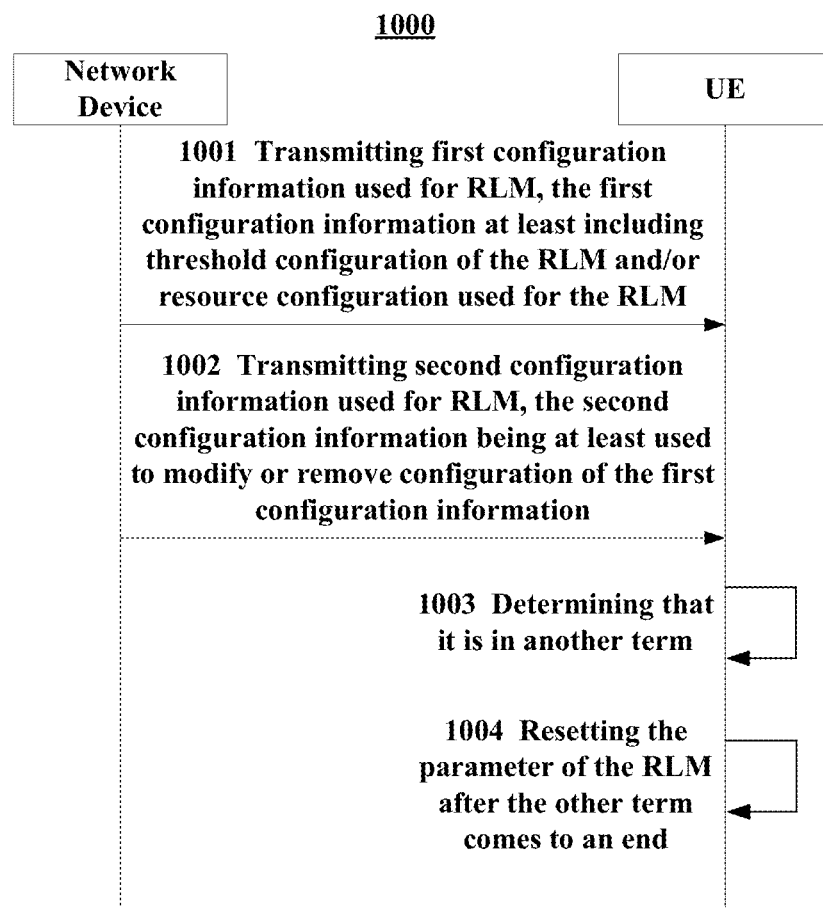
FIG. 10 is a further schematic diagram of the method for transmitting and receiving configuration information of Embodiment 1 of this disclosure.

FIG. 10 is a further schematic diagram of the method for transmitting and receiving configuration information of the embodiment of this disclosure. As shown in FIG. 10, the method 1000 for transmitting and receiving configuration information includes:

step 1001: the network device transmits the first configuration information used for radio link monitoring to the terminal device, the first configuration information at least including threshold configuration of the radio link monitoring and/or resource configuration used for the radio link monitoring; and step 1002: the network device transmits the second configuration information used for radio link monitoring to the terminal device, the second configuration information being at least used to modify or remove configuration of the first configuration information.

As shown in FIG. 10, the method may further include:

step 1003: the terminal device determines that it is in another term than the first term for performing normal operation; and step 1004: the terminal device applies the second configuration information to the radio link monitoring after the other term comes to an end.

In this embodiment, if the terminal device is in the term of normal operation, the new configuration may be applied immediately upon receiving a message including a reconfiguration resource or threshold. If the terminal device is in another term than the normal operation, when the message including the reconfiguration resource or threshold is received, the new configuration is applied after waiting for the end of the term.

For example, the other term than the first term for performing the normal operation includes: a second term for performing radio problem detection. If the terminal device is in the second term (T2) of the radio problem detection, upon receiving the message including the reconfiguration resource or the threshold, the terminal device may first apply current configuration (such as the first configuration information), then apply the new configuration (such as the second configuration information) until any in-synchronization indication is received, or the number of pieces of continuously received out-of-synchronization indication reaches a number M, the continuously received out-of-synchronization indication including consecutive out-of-synchronization that has been received before the second configuration information is received.

For example, M may be identical to the number (such as N310) of pieces of consecutive out-of-synchronization indication for starting a timer (such as T310) used for radio problem recovery, or may be a different standard defined or network device configured numeral value, such as a value smaller than the above number N310, so as to terminate the process more quickly, or may be a value greater than the above number N310, so as to be adapted for services having loose radio link quality requirements.

For another example, the other term than the first term of performing the normal operation includes: a third term for performing radio problem recovery. If the terminal device receives a message including a reconfiguration resource or a threshold during operation of a timer (such as T310) for recovery, the current configuration (such as the first configuration information) may be applied first, until the timer expires, or any out-of-synchronization indication is received, or the number of pieces of continuously received in-synchronization indication reaches a number S, the terminal device applies the new configuration (such as the second configuration information) again.

For example, S may be identical to the number (such as N311) of pieces of consecutive in-synchronization indication for stopping a timer (such as T310) used for radio problem recovery, or may be a different standard defined or network device configured numeral value, such as a value smaller than the above number N311, so as to terminate the process more quickly, or may be a value greater than the above number N311, so as to be adapted for services having sensitive radio link quality requirements.

This disclosure is described above by taking the terms shown in FIG. 2 as examples; however, this disclosure is not limited thereto. For example, the start and stop of the timer are not limited to the terms of the radio problem detection, and may be applicable to other scenarios, and the above M, S, etc., may also be applicable to other scenarios.

Hence, not only introduction of beams and different services having different radio link quality requirements may be supported, but also flexibility and accuracy of configuration of radio link monitoring may be supported. Furthermore, the implementations are simple, and by applying the reconfiguration operations at appropriate times, influence on the process of RLM or triggering the RLF may be reduced, and the terminal device may be enabled to more accurately evaluate the quality of the radio link.

Description shall be given below by way of two examples:

For example, in a period in which T310 is not in operation, when UE continuously receives n-th out-of-synchronization indication notified by a lower layer (such as the physical layer) at an RRC layer (where, n is smaller than the number N310 of pieces of the consecutive out-of-synchronization indication triggering start of the recovery timer), the UE receives the reconfiguration message; and in the RLM-related parameters included in the reconfiguration message, the resource used for the RLM is different from the current configuration; for example, after the low layer successfully finishes beam failure recovery, the network device reconfigures one or more resources to a new service beam corresponds;

if next indication from the lower layer is in-synchronization indication, the RRC layer of the UE will apply the resource configuration in the reconfiguration message; and if the next indication from the lower layer is still out-of-synchronization indication and n+1 is less than N310, the UE will still use the previously configured resources for the RLM, and repeatedly receives the indication and performs determination; until N310-th out-of-synchronization indication or a piece of in-synchronization indication is received, the RRC layer of the UE applies the resource configuration in the reconfiguration message again; in this way, it can be avoided a problem of inaccurate determination resulted from performing radio link problem detection by using different resources in the same term.

For another example, in a period in which T310 is in operation, the UE receives the reconfiguration message; in the RLM related parameters included in the reconfiguration message, the IS/OOS threshold configuration changes, for example, new configuration is looser due to lower reliability requirements; at this moment of time, the UE may not apply the threshold configuration in the reconfiguration message, but continue to receive indication from the lower layer, and based on the number of pieces of consecutive in-synchronization indication smaller than N311, determine that the recovery is successful; here, with less pieces of consecutive in-synchronization indication, it is possible to compensate for inaccuracies caused by the inability to use loose thresholds for performing determination.

The reconfiguration of the radio link monitoring via the second configuration information is described above. And furthermore, the terminal device may also determine different thresholds by itself.

In one embodiment, the terminal device may apply a second radio link monitoring threshold after determining different thresholds by itself. And furthermore, the terminal device may perform at least one of the following: recounting consecutive out-of-synchronization indication, resetting a consecutive out-of-synchronization indication counter, recounting consecutive in-synchronization indication, resetting a consecutive in-synchronization indication counter, and restarting a first timer.

In one embodiment, the terminal device may perform the radio link monitoring based on the first configuration information and a first radio link monitoring threshold, and determine a second radio link monitoring threshold according to a selection criterion. The second radio link monitoring threshold is different from the first radio link monitoring threshold, and the selection criterion is predefined or configured by the network device for the terminal device. For example, the first configuration information may be used to configure the selection criterion.

Figure 11:
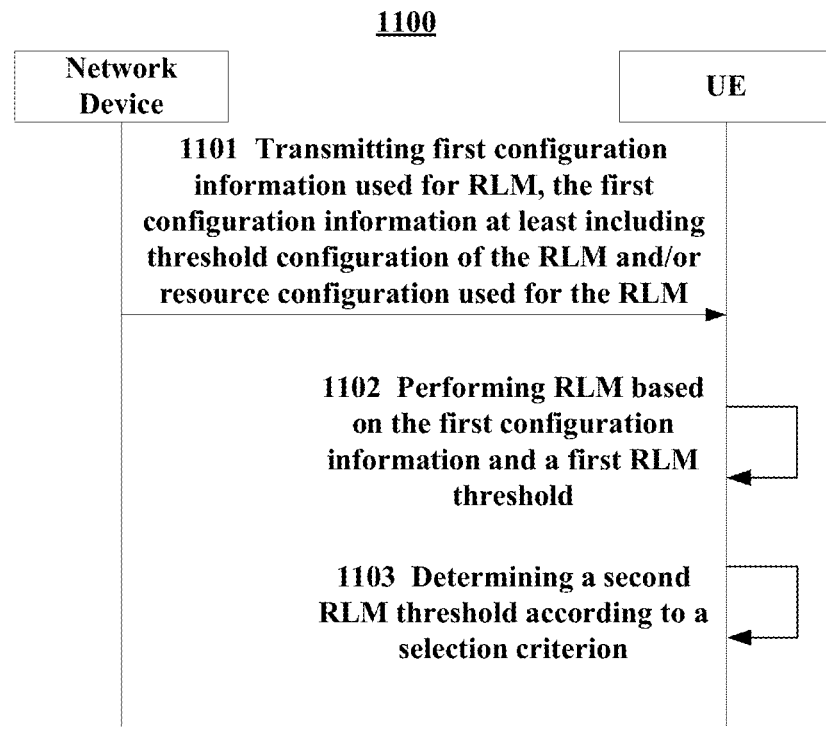
FIG. 11 is yet another schematic diagram of the method for transmitting and receiving configuration information of Embodiment 1 of this disclosure.

FIG. 11 is yet another schematic diagram of the method for transmitting and receiving configuration information of the embodiment of this disclosure. As shown in FIG. 11, the method 1100 for transmitting and receiving configuration information includes:

step 1101: the network device transmits the first configuration information used for radio link monitoring to the terminal device, the first configuration information at least including threshold configuration of the radio link monitoring and/or resource configuration used for the radio link monitoring.

As shown in FIG. 11, the method may further include:

step 1102: the terminal device performs the radio link monitoring according to the first configuration information and the first radio link monitoring threshold; and step 1103: the terminal device determines the second radio link monitoring threshold according to the selection criterion.

Hence, not only introduction of beams and different services having different radio link quality requirements may be supported, but also flexibility and accuracy of configuration of radio link monitoring may be supported. Furthermore, the implementations are simple, and by applying the reconfiguration operations at appropriate times, influence on the process of RLM or triggering the RLF may be reduced, and the terminal device may be enabled to more accurately evaluate the quality of the radio link.

Figure 12:
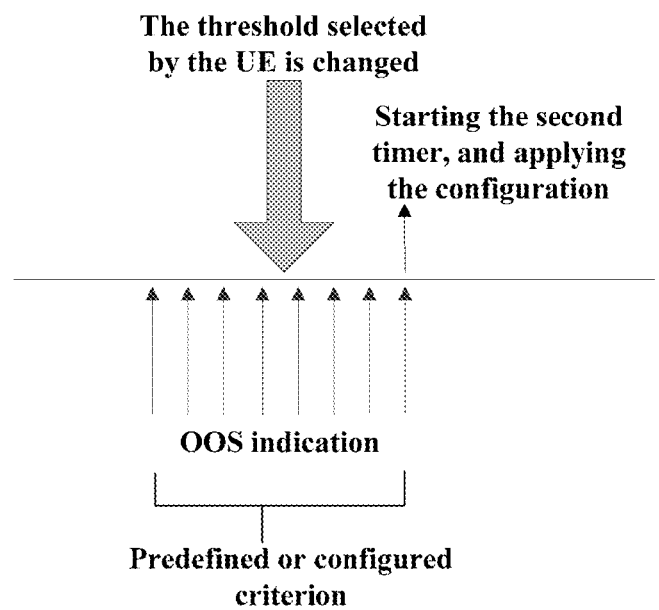
FIG. 12 is still another exemplary diagram of configuration information being applied of Embodiment 1 of this disclosure.

FIG. 12 is still another exemplary diagram of configuration information being applied of the embodiment of this disclosure. As shown in FIG. 12, before determining the second radio link monitoring threshold, the terminal device may determine that there exists at least one piece of out-of-synchronization indication. The terminal device may determine and start a second timer according to a predefined criterion, and apply the second radio link monitoring threshold to the radio link monitoring.

The terminal device may start the second timer according to a predefined fifth criterion, or start the second timer according to a sixth criterion, the sixth criterion being determined based on at least the first configuration information. For example, the fifth criterion is that the number of pieces of the consecutive out-of-synchronization indication is equal to a predefined fifth numeral value, and/or the sixth criterion is that the number of pieces of the consecutive out-of-synchronization indication is equal to a sixth numeral value, the sixth numeral value being obtained at least based on the first configuration information.

For example, the predefined fifth numeral value may be a constant, or the predefined fifth numeral value may be a numeral value determined from at least two candidate numeral values based on a predefined rule. Reference may be made to the previous implementations for particular contents of the fifth criterion, the sixth criterion, the fifth numeral value and the sixth numeral value; for example, they may be similar to the first criterion, and the first numeral value, etc.

Figure 13:
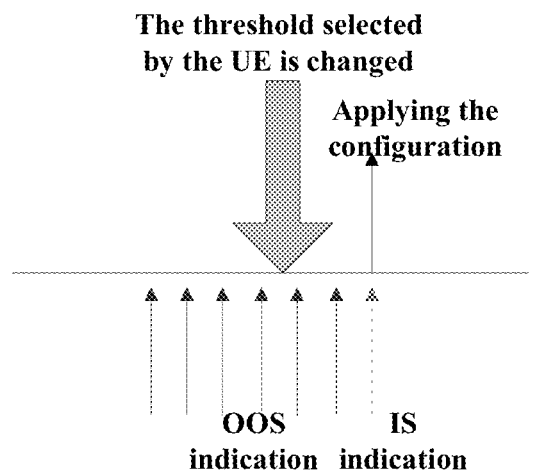
FIG. 13 is a yet further exemplary diagram of configuration information being applied of Embodiment 1 of this disclosure.

FIG. 13 is a yet further exemplary diagram of configuration information being applied of the embodiment of this disclosure. As shown in FIG. 13, before determining the second radio link monitoring threshold, the terminal device may determine that there exists at least one piece of out-of-synchronization indication; after determining the second radio link monitoring threshold, the terminal device may determine that there exists at least one piece of in-synchronization indication, and apply the second radio link monitoring threshold to the radio link monitoring.

Figure 14:
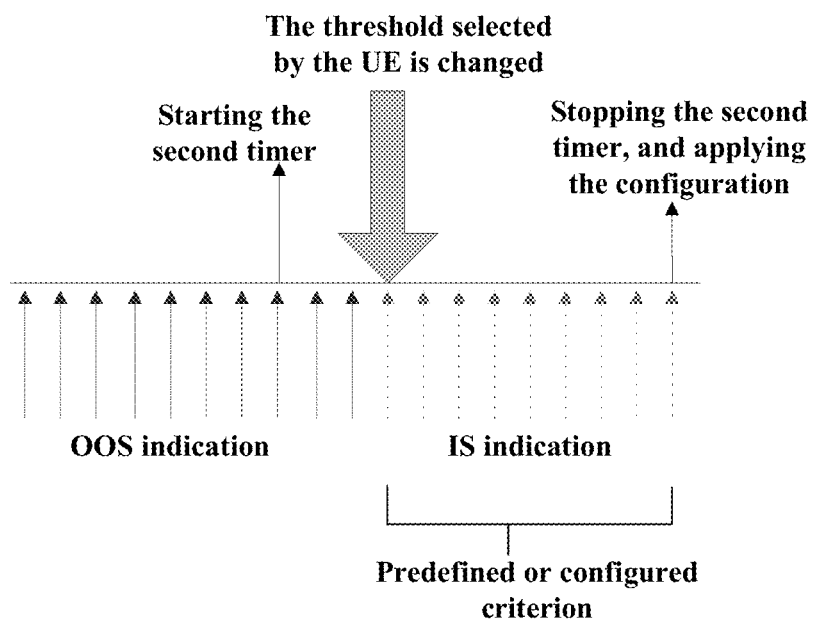
FIG. 14 is yet further another exemplary diagram of configuration information being applied of Embodiment 1 of this disclosure.

FIG. 14 is yet further another exemplary diagram of configuration information being applied of the embodiment of this disclosure. As shown in FIG. 14, before determining the second radio link monitoring threshold, the terminal device may start the second timer; and when the second timer expires or stops, the terminal device may apply the second radio link monitoring threshold to the radio link monitoring.

The terminal device may stop the second timer according to a predefined seventh criterion, or stop the second timer according to an eighth criterion, the eighth criterion being determined based on at least the first configuration information. For example, the seventh criterion is that the number of pieces of the consecutive in-synchronization indication is equal to a predefined seventh numeral value, and/or the eighth criterion is that the number of pieces of the consecutive in-synchronization indication is equal to an eighth numeral value, the eighth numeral value being obtained at least based on the first configuration information.

For example, the predefined seventh numeral value may be a constant, or the predefined seventh numeral value may be a numeral value determined from at least two candidate numeral values based on a predefined rule. Reference may be made to the previous implementations for particular contents of the seventh criterion, the eighth criterion, the seventh numeral value and the eighth numeral value; for example, they may be similar to the first criterion, and the first numeral value, etc.

Figure 15:
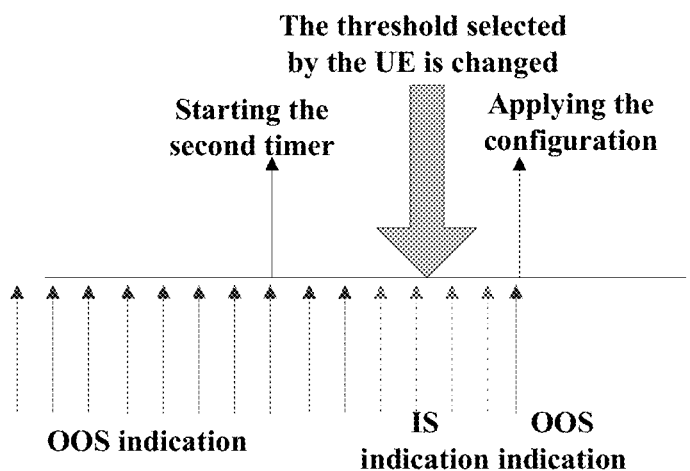
FIG. 15 is a yet still another exemplary diagram of configuration information being applied of Embodiment 1 of this disclosure.

FIG. 15 is a yet still another exemplary diagram of configuration information being applied of the embodiment of this disclosure. For another example, as shown in FIG. 15, before determining the second radio link monitoring threshold, the terminal device has started the second timer, and after determining the second radio link monitoring threshold, the terminal device may determine that there exists at least one piece of out-of-synchronization indication, and apply the second radio link monitoring threshold to the radio link monitoring.

For a case where the terminal device applies the second radio link monitoring threshold to the radio link monitoring after determining different thresholds by itself, the terminal device may determine times for applying the threshold according to the terms shown in FIG. 2, and reference may be made to the previous implementations for particular contents. However, this disclosure is not limited thereto, and it may also be applicable to other scenarios.

It should be noted that the embodiment of this disclosure is only illustrated in FIGS. 5-15; however, this disclosure is not limited thereto. For example, an order of execution of the steps may be appropriately adjusted; and furthermore, some other steps may be added, or some of these steps may be reduced. And appropriate variants may be made by those skilled in the art according to what is described above, without being limited to the disclosure contained in FIGS. 5-15.

It can be seen from the above embodiments that the terminal device receives the first configuration information used for radio link monitoring transmitted by the network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

Embodiment 2

These embodiments of this disclosure provide a method for transmitting configuration information, with contents identical to those in Embodiment 1 being not going to be described herein any further.

Figure 16:
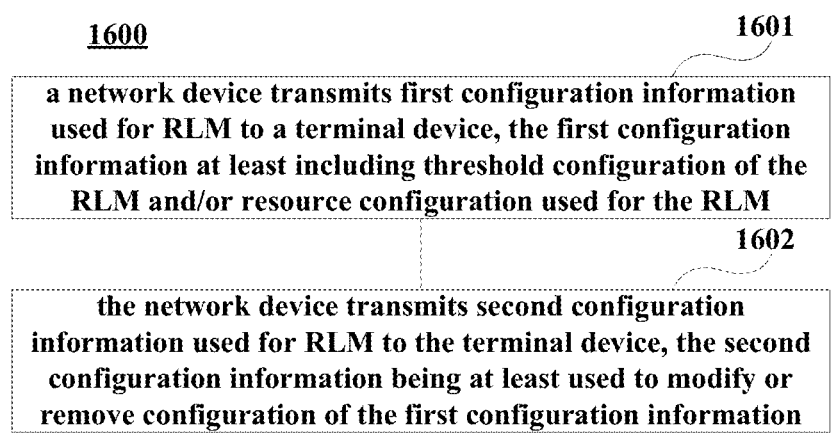
FIG. 16 is a schematic diagram of the method for transmitting configuration information of Embodiment 2 of this disclosure.

FIG. 16 is a schematic diagram of the method for transmitting configuration information of the embodiment of this disclosure, in which a case at a network device side is shown. As shown in FIG. 16, the method 1600 for transmitting configuration information includes:

step 1601: a network device transmits first configuration information used for radio link monitoring to a terminal device, the first configuration information at least including threshold configuration of the radio link monitoring and/or resource configuration used for the radio link monitoring.

As shown in FIG. 16, the method may further include:

step 1602: the network device transmits second configuration information used for radio link monitoring to the terminal device, the second configuration information being at least used to modify or remove configuration of the first configuration information.

It should be noted that the embodiment of this disclosure is only illustrated in FIG. 16; however, this disclosure is not limited thereto. For example, an order of execution of the steps may be appropriately adjusted; and furthermore, some other steps may be added, or some of these steps may be reduced. And appropriate variants may be made by those skilled in the art according to what is described above, without being limited to the disclosure contained in FIG. 16.

It can be seen from the above embodiments that the terminal device receives the first configuration information used for radio link monitoring transmitted by the network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

Embodiment 3

These embodiments of this disclosure provide an apparatus for receiving configuration information, which may be, for example, a terminal device, or may be one or more parts or components configured in a terminal device. And contents in these embodiments identical to those in Embodiment 1 shall not be described herein any further.

Figure 17:
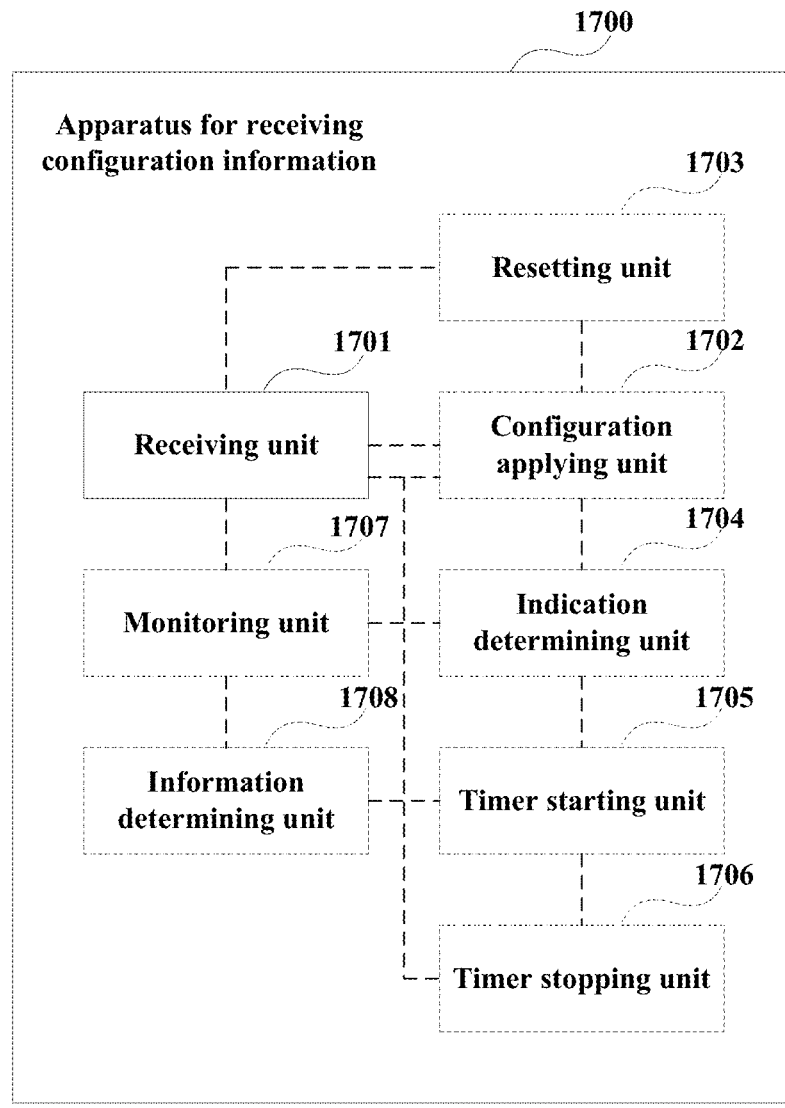
FIG. 17 is a schematic diagram of the apparatus for receiving configuration information of Embodiment 3 of this disclosure.

FIG. 17 is a schematic diagram of the apparatus for receiving configuration information of the embodiment of this disclosure. As shown in FIG. 17, an apparatus 1700 for receiving configuration information includes:

a receiving unit 1701 configured to receive first configuration information used for radio link monitoring transmitted by a network device, the first configuration information at least including threshold configuration of the radio link monitoring and/or resource configuration used for the radio link monitoring.

In one embodiment, the receiving unit 1701 is further configured to receive second configuration information used for radio link monitoring transmitted by the network device, the second configuration information being at least used to modify or remove configuration of the first configuration information.

In one embodiment, as shown in FIG. 17, the apparatus 1700 for receiving configuration information may further include:

a configuration applying unit 1702 configured to apply configuration modified or removed based on the second configuration information to the radio link monitoring; and a resetting unit 1703 configured to perform at least one of recounting consecutive out-of-synchronization indication, resetting a consecutive out-of-synchronization indication counter, recounting consecutive in-synchronization indication, resetting a consecutive in-synchronization indication counter, and restarting a first timer.

In one embodiment, as shown in FIG. 17, the apparatus 1700 for receiving configuration information may further include:

an indication determining unit 1704 configured to determine that there exists at least one piece of out-of-synchronization indication; and a timer starting unit 1705 configured to start a second timer;

and the configuration applying unit 1702 applies configuration modified or removed based on the second configuration information to the radio link monitoring.

In one embodiment, the indication determining unit 1704 determines that there exists at least one piece of in-synchronization indication, and the configuration applying unit 1702 applies configuration modified or removed based on the second configuration information to the radio link monitoring.

In one embodiment, the timer starting unit 1705 starts the second timer, and the configuration applying unit 1702 applies the configuration modified or removed based on the second configuration information to the radio link monitoring when the second timer expires or stops.

In one embodiment, the indication determining unit 1704 determines that there exists at least one piece of out-of-synchronization indication, and the configuration applying unit 1702 applies configuration modified or removed based on the second configuration information to the radio link monitoring.

In one embodiment, as shown in FIG. 17, the apparatus 1700 for receiving configuration information may further include:

a timer stopping unit 1706 configured to stop the second timer according to a predefined third criterion, or stop the second timer according to a fourth criterion determined at least based on the second configuration information.

In one embodiment, as shown in FIG. 17, the apparatus 1700 for receiving configuration information may further include:

a monitoring unit 1707 configured to perform the radio link monitoring based on the first configuration information and a first radio link monitoring threshold; and an information determining unit 1708 configured to determine a second radio link monitoring threshold according to a selection criterion, the second radio link monitoring threshold and the first radio link monitoring threshold being different, and the selection criterion being predefined or being configured by the network device for a terminal device.

It should be noted that the components or modules related to this disclosure are only illustrated above; however, this disclosure is not limited thereto. And the apparatus 1700 for receiving configuration information may further include other components or modules, and reference may be made to related techniques for particular contents of these components or modules.

Furthermore, for the sake of simplicity, connection relationships between the components or modules or signal profiles thereof are only illustrated in FIG. 17. However, it should be understood by those skilled in the art that such related techniques as bus connection, may be adopted. And the above components or modules may be implemented by hardware, such as a processor, a memory, a transmitter, and a receiver, which are not limited in the embodiments of this disclosure.

It can be seen from the above embodiments that the terminal device receives the first configuration information used for radio link monitoring transmitted by the network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

Embodiment 4

These embodiments of this disclosure provide an apparatus for transmitting configuration information, which may be, for example, a network device, or may be one or more parts or components configured in a network device. And contents in these embodiments identical to those in Embodiment 2 shall not be described herein any further.

Figure 18:
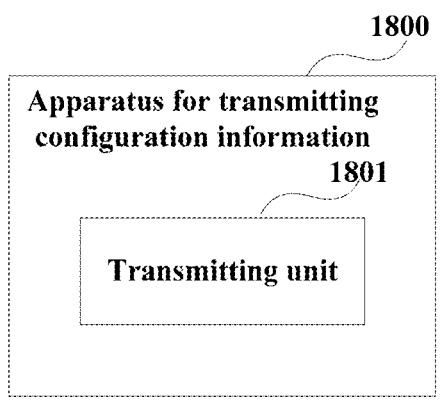
FIG. 18 is a schematic diagram of the apparatus for transmitting configuration information of Embodiment 4 of this disclosure.

FIG. 18 is a schematic diagram of the apparatus for transmitting configuration information of the embodiment of this disclosure. As shown in FIG. 18, an apparatus 1800 for transmitting configuration information includes:

a transmitting unit 1801 configured to transmit first configuration information used for radio link monitoring to a terminal device, the first configuration information at least including threshold configuration of the radio link monitoring and/or resource configuration used for the radio link monitoring.

In one embodiment, the transmitting unit 1801 may further be configured to transmit second configuration information used for radio link monitoring to the terminal device, the second configuration information being at least used to modify or remove configuration of the first configuration information.

Furthermore, for the sake of simplicity, connection relationships between the components or modules or signal profiles thereof are only illustrated in FIG. 18. However, it should be understood by those skilled in the art that such related techniques as bus connection, may be adopted. And the above components or modules may be implemented by hardware, such as a processor, a memory, a transmitter, and a receiver, which are not limited in the embodiments of this disclosure.

It can be seen from the above embodiments that the terminal device receives the first configuration information used for radio link monitoring transmitted by the network device, the first configuration information at least including threshold configuration of the radio link monitoring and/or resource configuration used for the radio link monitoring. Hence, not only introduction of beams may be supported and different services having different link quality demands may be supported, but also flexibility and accuracy of configuration of radio link monitoring may be improved.

Embodiment 5

These embodiments of this disclosure provide a communication system, reference being able to be made to FIG. 1, and contents identical to those in embodiments 1-4 being not going to be described herein any further. In an embodiment, a communication system 100 may include:
  a network device 101 configured with the apparatus 1800 for transmitting configuration information as described in Embodiment 4; and
  a terminal device 102 configured with the apparatus 1700 for receiving configuration information as described in Embodiment 3.

The embodiment of this disclosure further provides a network device, such as a base station; however, this disclosure is not limited thereto, and may also be other network devices.

Figure 19:
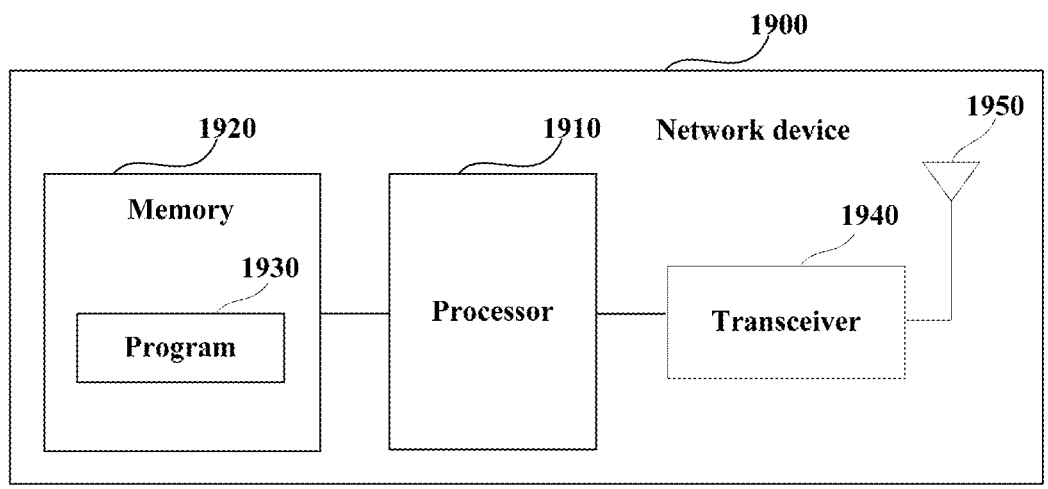
FIG. 19 is a schematic diagram of the network device of Embodiment 5 of this disclosure.

FIG. 19 is a schematic diagram of a structure of the network device of the embodiment of this disclosure. As shown in FIG. 19, a network device 1900 may include a processor 1910 (such as a central processing unit (CPU)) and a memory 1920, the memory 1920 being coupled to the processor 1910. The memory 1920 may store various data, and furthermore, it may store a program 1930 for data processing, and execute the program 1930 under control of the processor 1910.

For example, the processor 1910 may be configured to execute the program 1930 to carry out the method for transmitting configuration information as described in Embodiment 2. For example, the processor 1910 may be configured to perform the following control: transmitting first configuration information used for radio link monitoring to a terminal device, the first configuration information at least including threshold configuration of the radio link monitoring and/or resource configuration used for the radio link monitoring.

In one embodiment, the processor 1910 may further be configured to perform the following control: transmitting second configuration information used for radio link monitoring to the terminal device, the second configuration information being at least used to modify or remove configuration of the first configuration information.

Furthermore, as shown in FIG. 19, the network device 1900 may include a transceiver 1940, and an antenna 1950, etc. Functions of the above components are similar to those in the relevant art, and shall not be described herein any further. It should be noted that the network device 1900 does not necessarily include all the parts shown in FIG. 19, and furthermore, the network device 1900 may include parts not shown in FIG. 19, and the relevant art may be referred to.

The embodiment of this disclosure further provides a terminal device; however, this disclosure is not limited thereto, and may also be other devices.

Figure 20:
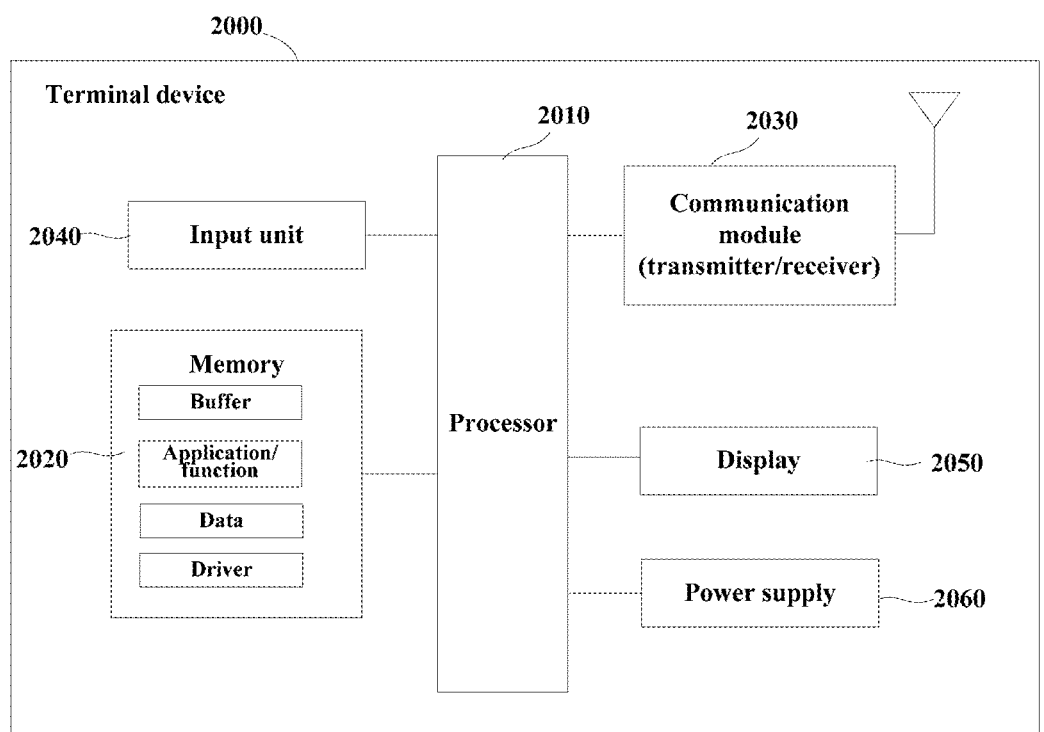
FIG. 20 is a schematic diagram of the terminal device of Embodiment 5 of this disclosure.

FIG. 20 is a schematic diagram of the terminal device of the embodiment of this disclosure. As shown in FIG. 20, a terminal device 2000 may include a processor 2010 and a memory 2020, the memory 2020 storing data and programs and being coupled to the processor 2010. It should be noted that this figure is illustrative only, and other types of structures may also be used, so as to supplement or replace this structure and achieve a telecommunications function or other functions.

For example, the processor 2010 may be configured to execute a program to perform the following control: receiving first configuration information used for radio link monitoring transmitted by a network device, the first configuration information at least including threshold configuration of the radio link monitoring and/or resource configuration used for the radio link monitoring.

In one embodiment, the threshold configuration of the radio link monitoring includes: a criterion and/or a parameter used for selecting a radio link monitoring threshold from a plurality of thresholds, and/or an index indicating an in-synchronization threshold and/or an out-of-synchronization threshold. And the resource configuration used for the radio link monitoring includes: an index indicating a synchronization signal block, and/or an ID used for obtaining a channel state information reference signal resource.

In one embodiment, the processor 2010 may be configured to perform the following control: receiving second configuration information used for radio link monitoring transmitted by the network device, the second configuration information being at least used to modify or remove configuration of the first configuration information.

In one embodiment, the processor 2010 may further be configured to perform the following control: applying configuration modified or removed based on the second configuration information to the radio link monitoring; and performing at least one of recounting consecutive out-of-synchronization indication, resetting a consecutive out-of-synchronization indication counter, recounting consecutive in-synchronization indication, resetting a consecutive in-synchronization indication counter, and restarting a first timer.

In one embodiment, the first timer is related to the number of pieces of the consecutive out-of-synchronization indication or the number of pieces of the consecutive in-synchronization indication.

In one embodiment, the processor 2010 may further be configured to perform the following control: determining that there exists at least one piece of out-of-synchronization indication; starting a second timer; and applying configuration modified or removed based on the second configuration information to the radio link monitoring.

In one embodiment, the processor 2010 may further be configured to perform the following control: determining that there exists at least one piece of in-synchronization indication; and applying configuration modified or removed based on the second configuration information to the radio link monitoring.

In one embodiment, the processor 2010 may further be configured to perform the following control: starting the second timer according to a predefined first criterion, or starting the second timer according to a second criterion determined at least based on the second configuration information.

In one embodiment, the first criterion is that the number of pieces of the consecutive out-of-synchronization indication is equal to a predefined first numeral value, and/or the second criterion is that the number of pieces of the consecutive out-of-synchronization indication is equal to a second numeral value, the second numeral value being obtained at least based on the second configuration information; the predefined first numeral value is a constant, or the predefined first numeral value is a numeral value determined from at least two candidate numeral values based on a predefined rule.

In one embodiment, the processor 2010 may further be configured to perform the following control: starting a second timer; and applying configuration modified or removed based on the second configuration information to the radio link monitoring when the second timer expires or stops.

In one embodiment, the processor 2010 may further be configured to perform the following control: determining that there exists at least one piece of out-of-synchronization indication; and applying configuration modified or removed based on the second configuration information to the radio link monitoring.

In one embodiment, the processor 2010 may further be configured to perform the following control: stopping the second timer according to a predefined third criterion, or stopping the second timer according to a fourth criterion determined at least based on the second configuration information.

In one embodiment, the third criterion is that the number of pieces of the consecutive in-synchronization indication is equal to a predefined third numeral value, and/or the fourth criterion is that the number of pieces of the consecutive in-synchronization indication is equal to a fourth numeral value, the fourth numeral value being obtained at least based on the second configuration information; the predefined third numeral value is a constant, or the predefined third numeral value is a numeral value determined from at least two candidate numeral values based on a predefined rule.

In one embodiment, the processor 2010 may further be configured to perform the following control: performing the radio link monitoring based on the first configuration information and a first radio link monitoring threshold; and determining a second radio link monitoring threshold according to a selection criterion, the second radio link monitoring threshold and the first radio link monitoring threshold being different, and the selection criterion being predefined or being configured by the network device for a terminal device.

In one embodiment, the processor 2010 may further be configured to perform the following control: determining that there exists at least one piece of out-of-synchronization indication; starting the second timer; and applying the second radio link monitoring threshold to the radio link monitoring.

In one embodiment, the processor 2010 may further be configured to perform the following control: determining that there exists at least one piece of in-synchronization indication; and applying the second radio link monitoring threshold to the radio link monitoring.

In one embodiment, the processor 2010 may further be configured to perform the following control: applying the second radio link monitoring threshold to the radio link monitoring; and performing at least one of recounting consecutive out-of-synchronization indication, resetting a consecutive out-of-synchronization indication counter, recounting consecutive in-synchronization indication, resetting a consecutive in-synchronization indication counter, and restarting a first timer.

As shown in FIG. 20, the terminal device 2000 may further include a communication module 2030, an input unit 2040, a display 2050 and a power supply 2060. Functions of the above components are similar to those in the relevant art, and shall not be described herein any further. It should be noted that the terminal device 2000 does not necessarily include all the parts shown in FIG. 20, and the above components are not necessary; and furthermore, the terminal device 2000 may include parts not shown in FIG. 20, and the relevant art may be referred to.

An embodiment of the present disclosure provides a computer readable program code, which, when executed in a network device, may cause the network device to carry out the method for transmitting configuration information as described in Embodiment 2.

An embodiment of the present disclosure provides a computer storage medium, including a computer readable program code, which may cause a network device to carry out the method for transmitting configuration information as described in Embodiment 2.

An embodiment of the present disclosure provides a computer readable program code, which, when executed in a terminal device, may cause the terminal device to carry out the method for receiving configuration information as described in Embodiment 1.

An embodiment of the present disclosure provides a computer storage medium, including a computer readable program code, which may cause a terminal device to carry out the method receiving configuration information as described in Embodiment 1.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for receiving configuration information, comprising:
a receiver configured to receive first configuration information used for radio link monitoring transmitted by a network device, and after that, receive second configuration information used for radio link monitoring transmitted by the network device, the first configuration information at least comprising resource configuration used for the radio link monitoring, and the second configuration information being at least used to modify or remove configuration of the first configuration information; and
a processor configured to:
control the radio link monitoring according to the first configuration information, after that,
apply new configuration different from the first configuration information to the radio link monitoring in a case where the second configuration information being at least used to remove configuration of the first configuration information, and
in a case where the second configuration information being at least used to modify configuration of the first configuration information, perform resetting:
a consecutive out-of-synchronization indication counter (N310);
a consecutive in-synchronization indication counter (N311); and perform stopping
a timer (T310) used for recovery in a case where the timer is running, wherein
the consecutive out-of-synchronization indication counter is a counter counting an out-of-synchronization indication received by an RRC layer, and
the consecutive in-synchronization indication counter is a counter counting an in-synchronization indication received by the RRC layer.

2. The apparatus according to claim 1, wherein the resource configuration used for the radio link monitoring comprises: an index indicating a synchronization signal block, and/or an ID used for obtaining a channel state information reference signal resource.

3. The apparatus according to claim 1, wherein a first timer is started or stopped based on a number of the consecutive out-of-synchronization indication(s) or a number of the consecutive in-synchronization indication(s).

4. The apparatus according to claim 1, wherein the processor controls to determine that there exists at least one out-of-synchronization indication; start a second timer; and apply the configuration modified or removed based on the second configuration information to the radio link monitoring when there exists at least one piece of out-of-synchronization indication.

5. The apparatus according to claim 4, wherein the processor controls to start the second timer according to a predefined first criterion, or start the second timer according to a second criterion determined at least based on the second configuration information.

6. The apparatus according to claim 5, wherein the first criterion is that a number of the consecutive out-of-synchronization indication(s) is equal to a predefined first value, and/or the second criterion is that a number of the consecutive out-of-synchronization indication(s) is equal to a second value, the second value being obtained at least based on the second configuration information;
wherein, the predefined first value is a constant, or the predefined first value is a value determined from at least two candidate values based on a predefined rule.

7. The apparatus according to claim 1, wherein the processor controls to determine that there exists at least one in-synchronization indication; and apply the configuration modified or removed based on the second configuration information to the radio link monitoring.

8. The apparatus according to claim 1, wherein the processor controls to start a second timer; and apply the configuration modified or removed based on the second configuration information to the radio link monitoring when the second timer expires or stops.

9. The apparatus according to claim 8, wherein the processor controls to stop the second timer according to a predefined third criterion, or stop the second timer according to a fourth criterion determined at least based on the second configuration information.

10. The apparatus according to claim 9, wherein the third criterion is that a number of the consecutive in-synchronization indication(s) is equal to a predefined third value, and/or the fourth criterion is that a number of the consecutive in-synchronization indication(s) is equal to a fourth value, the fourth value being obtained at least based on the second configuration information;
wherein, the predefined third value is a constant, or the predefined third value is a value determined from at least two candidate values based on a predefined rule.

11. The apparatus according to claim 1, wherein the processor controls to determine that there exists at least one out-of-synchronization indication; and apply the configuration modified or removed based on the second configuration information to the radio link monitoring.

12. The apparatus according to claim 1, wherein the processor controls to perform the radio link monitoring based on the first configuration information and a first radio link monitoring threshold; and
determine a second radio link monitoring threshold according to a selection criterion, the second radio link monitoring threshold and the first radio link monitoring threshold being different, and the selection criterion being predefined or being configured by the network device for a terminal device.

13. The apparatus according to claim 12, wherein the processor controls to determine that there exists at least one out-of-synchronization indication; start a second timer; and apply the second radio link monitoring threshold to the radio link monitoring.

14. The apparatus according to claim 12, wherein the processor controls to determine that there exists at least one in-synchronization indication; and apply the second radio link monitoring threshold to the radio link monitoring.

15. The apparatus according to claim 12, wherein the processor controls to apply the second radio link monitoring threshold to the radio link monitoring; and perform at least one of recounting a number of consecutive out-of-synchronization indication(s), resetting a consecutive out-of-synchronization indication counter, recounting a number of consecutive in-synchronization indication(s), resetting a consecutive in-synchronization indication counter, and restarting a first timer.

16. An apparatus for transmitting configuration information, comprising:
   a memory; and,
   a processor coupled to the memory; the processor configured to control to:
   transmit first configuration information used for radio link monitoring to a terminal device, and after that, transmit second configuration information used for radio link monitoring to the terminal device, the first configuration information at least comprising resource configuration used for the radio link monitoring, and the second configuration information being at least used to modify or remove configuration of the first configuration information;
   wherein the terminal device:
      controls the radio link monitoring according to the first configuration information, and after that,
      apply new configuration different from the first configuration information to the radio link monitoring,
      in a case where the second configuration information being at least used to remove configuration of the first configuration information, and
      in a case where the second configuration information being at least used to modify configuration of the first configuration information, perform resetting:
         a consecutive out-of-synchronization indication counter (N310);
         a consecutive in-synchronization indication counter (N311); and perform stopping
         a timer (T310) used for recovery in a case where the timer is running,
   the consecutive out-of-synchronization indication counter being a counter counting an out-of-synchronization indication received by an RRC layer, the consecutive in-synchronization indication counter being a counter counting an in-synchronization indication received by the RRC layer.

17. A communication system, comprising:
   a network device configured to transmit a first configuration information, and after that, transmit a second configuration information, the first configuration information at least comprising resource configuration used for the radio link monitoring, and the second configuration information being at least used to modify or remove configuration of the first configuration information; and
   a terminal device configured to receive the first configuration information used for radio link monitoring, apply configuration modified or removed based on the second configuration information to the radio link monitoring, and after that, receive the second configuration information used for radio link monitoring,
   wherein the terminal device:
      control the radio link monitoring according to the first configuration information, after that,
      apply new configuration different from the first configuration information to the radio link monitoring in a case where the second configuration information being at least used to remove configuration of the first configuration information, and
      in a case where the second configuration information being at least used to modify configuration of the first configuration information, perform resetting:
         a consecutive out-of-synchronization indication counter (N310);
         a consecutive in-synchronization indication counter (N311); and perform stopping
         a timer (T310) used for recovery in a case where the timer is running,
   the consecutive out-of-synchronization indication counter being a counter counting an out-of-synchronization indication received by an RRC layer, the consecutive in-synchronization indication counter being a counter counting an in-synchronization indication received by the RRC layer.

* * * * *